United States Patent [19]

Mashimo et al.

[11] Patent Number: 4,762,745
[45] Date of Patent: Aug. 9, 1988

[54] RUBBER/FABRIC COMPOSITE MANUFACTURE

[75] Inventors: Satoshi Mashimo, Akashi; Masayuki Tanaka, Kobe; Takashi Kinoshita, Hyogo, all of Japan

[73] Assignee: Mitsuboshi Belting Ltd., Nagata, Japan

[21] Appl. No.: 943,732

[22] Filed: Dec. 19, 1986

Related U.S. Application Data

[63] Continuation-in-part of Ser. No. 470,162, Feb. 28, 1983, abandoned.

[51] Int. Cl.$^4$ .................... C08D 13/16; B32B 27/36
[52] U.S. Cl. .................... 428/252; 428/286; 428/287; 428/295; 428/910
[58] Field of Search ............. 428/252, 286, 287, 295, 428/910; 427/412; 156/314, 331.2, 307.3, 307.5; 524/510; 525/139

[56] References Cited

U.S. PATENT DOCUMENTS 3,697,310 10/1972 Kurihara et al. ............. 156/110 A
4,031,288  6/1977 Bhakuni et al. ............... 428/379
4,404,329  9/1983 Maeda et al. .................. 525/352

FOREIGN PATENT DOCUMENTS 456811 1/1975 U.S.S.R. .

Primary Examiner—Marion C. McCamish
Attorney, Agent, or Firm—Wood, Dalton, Phillips, Mason & Rowe

[57] ABSTRACT

A method of bonding fabric to rubber in forming a composite having adhesive strength therebetween. The method includes pretreating the fabric by subjecting it to a solvent selected from the group consisting of isocyanate solvent, epoxy solvent, and liquid mixtures thereof, subjecting the pretreated fabric to a liquid containing acrylonitrile-butadiene-latex and a resorcinol-formalin mixture wherein the solid weight ratio of the acrylonitrile-butadiene-latex to the resorcinol-formalin is in the range of from approximately 10 to 1 to approximately 2 to 1, the mol ratio of resorcinol to formalin is in the range of from approximately 1 to 3 to approximately 3 to 1, and the acrylonitrile-butadiene-latex contains at least approximately 3% carboxyl groups, heat treating the fabric, and vulcanizing unvulcanized high temperature resistant hydronitrile rubber in association with said fabric. A rubber/fabric composite manufacture embodying the invention utilizing a rubber composite having an isocyanurate organic peroxide vulcanizing agent is disclosed.

10 Claims, 1 Drawing Sheet

RUBBER/FABRIC COMPOSITE MANUFACTURE

CROSS-REFERENCE TO RELATED APPLICATION

This application comprises a continuation-in-part of our copending application Ser. No. 470,162, filed Feb. 28, 1983, entitled "Rubber/Fabric Composite Manufacture", now abandoned.

TECHNICAL FIELD

This invention relates to rubber/fabric composite manufacture and in particular to the bonding of fabric to rubber in forming such a composite.

BACKGROUND ART

In many industrial applications, such as in drive belts, fluid conducting hoses, etc., it is desirable to reinforce a rubber body with a suitable fabric. In one such application, the reinforced rubber element is subjected to oil and the like. The device may further be subjected to high temperature conditions in normal use. One such environment is that found in connection with hoses and drive belts, such as used in vehicle engine apparatuses, and the like.

Recently a rubber known as hydronitrile rubber has been developed which is both oil and temperature resistant. Such rubber has found wide use in such applications.

However, in order to provide high thermal resistance, hydrogen has been added to the rubber to saturate the double bond thereof to prevent recoupling of the rubber at high temperature with sulfur. Further, it has been conventional to minimize or eliminate the use of sulfur in the rubber compound. This, however, presents the serious problem of loss of adhesion of the reinforcing fabric to the rubber, as such adhesion conventionally has relied upon the presence of sulfur in the rubber compound.

DISCLOSURE OF INVENTION

The present invention comprehends a novel solution to the problem of fabric adhesion to the rubber without requiring the presence of sulfur in the rubber compound.

More specifically, the invention comprehends an improved manufacture formed by bonding a fabric to a sulfur-free hydronitrile rubber compound including the steps of subjecting the fabric to a liquid containing acrylonitrile-butadiene-latex and a resorcinol-formalin mixture wherein the solid weight ratio of the acrylonitrile-butadiene-latex to the resorcinol-formalin is in the range of from approximately 10 to 1 to approximately 2 to 1, the mol ratio of resorcinol to formalin is in the range of from approximately 1 to 3 to approximately 3 to 1, and the acrylonitrile-butadiene-latex contains at least approximately 3% carboxyl groups, and vulcanizing the unvulcanized high temperature-resistant hydronitrile rubber in association with the fabric.

In the illustrated invention, the fabric may comprise a wide range of different fabrics, including cotton, rayon, polyvinyl alcohol, aliphatic polyamide, aromatic polyamide, polyester, glass, etc.

In the illustrated embodiment, the mol ratio of resorcinol to formalin is in the range of approximately 1 to 1 to approximately 2 to 1.

In the illustrated embodiment, the solid weight ratio of acrylonitrile-butadiene-latex to resorcinol-formalin is in the range of approximately 8 to 1 to approximately 4 to 1.

In the illustrated embodiment, the fabric is pretreated by subjection to a solvent selected from the group consisting of isocyanate solvent, epoxy solvent, mixtures thereof, etc.

In the illustrated embodiment, the pretreated fabric is dried prior to subjection thereof to the mixture liquid.

In the illustrated embodiment, the fabric is best treated following the subjection thereof to the mixture liquid and prior to the vulcanization of the hydronitrile rubber in association therewith.

In the illustrated embodiment, the heat treatment step is carried out at a temperature in the range of approximately 140° C. to approximately 210° C.

The heat treatment step, in the illustrated embodiment, is conducted for approximately 2 minutes.

The drying of the retreated fabric, in the illustrated embodiment, is carried out at a temperature lower than the temperature at which the heat treating step is carried out.

The novel method of bonding a fabric to a hydronitrile rubber in forming a composite thereof is extremely simple and economical while yet providing an improved rubber/fabric composite wherein the fabric is strongly bonded to the rubber, notwithstanding the minimization or elimination of sulfur in the rubber compound. Thus, the improved rubber/fabric composite is adaptable for use in oily and high temperature environments.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
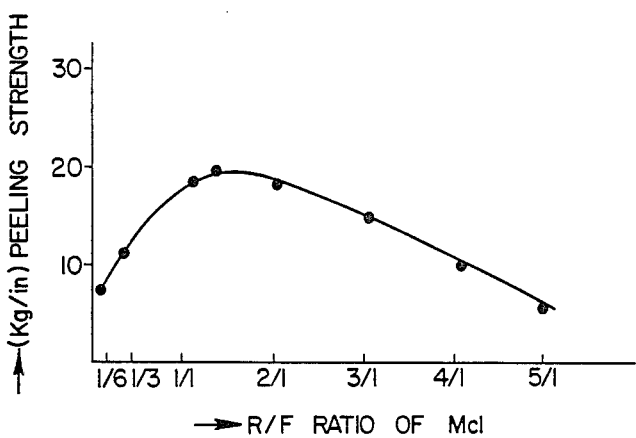
FIG. 1 is a graph illustrating the relationship of the mol ratio of resorcinol in the liquid mixture relative to the adhesive or peeling strength of the bond between the fabric and hydronitrile rubber in the manufacture thereof in accordance with the invention hereof.

In the illustrative embodiment of the invention, a rubber/fabric composite is manfactured by a novel method wherein the fabric is bonded to the rubber compound so as to have high adhesiveness, or peeling strength, while yet permitting the rubber to have low sulfur content and, thus, constitute a high temperature resistance rubber. Thus, the rubber/fabric composite of the present invention is ideally suited for environments wherein the composite is subjected not only to oil, but also to high temperatures while yet maintaining high adhesiveness between the reinforcing fabric and the rubber of the composite.

In describing the invention, the preferred rubber member of the composite comprises a high temperature-resistant hydronitrile rubber and, thus, one which has low or zero sulfur content. By hydrogenating the nitrile rubber in forming hydronitrile rubber, an improved oil and temperature-resistant rubber is provided, as broadly discussed above. The present invention provides high adhesiveness of the fabric thereto by treating the fabric in one or more steps prior to the vulcanizing of the rubber in association therewith.

More specifically, the fabric to be used in the composite may comprise any suitable fabric, such as one formed of cotton, rayon, polyvinyl alcohol, aliphatic polyamide, aromatic polyamide, polyester, glass, etc., fibers or yarns.

The invention comprehends subjecting the fabric to a liquid containing acrylonitrile-butadiene-latex and a resorcinol-formalin mixture wherein the solid weight ratio of the acrylonitrile-butadiene-latex to resorcinol-formalin is in the range of approximately 10 to 1 to approximately 2 to 1.

In the illustrated embodiment, the mol ratio of resorcinol to formalin in the mixture is in the range of approximately 1 to 3 to approximately 3 to 1.

In the illustrated embodiment, the acrylonitrile-butadiene-latex preferably contains at least approximately 3% carboxyl groups.

In the illustrated embodiment, the fabric is pretreated prior to subjecting it to the liquid mixture. In the pretreatment, the fabric is subjected to a solvent selected from the group consisting of isocyanate solvent, epoxy solvent, and liquid mixtures thereof.

In a preferred form, the mol ratio of resorcinol to formalin in the fabric treating liquid is in the range of approximately 1 to 1 to approximately 2 to 1.

In a preferred form, the solid weight ratio of the acrylonitrile-butadiene-latex to resorcinol-formalin in the liquid mixture is in the range of approximately 8 to 1 to approximately 4 to 1.

In the illustrative embodiment, the fabric is preferably dried prior to the step of subjecting it to the latex liquid mixture. The drying is preferably carried out at an elevated temperature.

In the illustrative embodiment, subsequent to the subjection of the fabric to the latex liquid mixture, the fabric is heat treated by subjection thereof to a temperature in the range of approximately 140° to 210° C.

In the preferred embodiment, the heat treatment step is carried out at a temperature in the range of approximately 190° C. to approximately 200° C. for approximately two minutes.

In the preferred embodiment, the temperature at which the fabric is dried subsequent to the pretreatment step is preferably lower than the temperature at which the fabric is heat treated following subjection thereof to the latex liquid mixture.

In the illustrative embodiment, where the fabric is formed of aromatic polyamide fiber, the drying step is preferably carried out at a temperature in the range of approximately 180° C. to approximately 190° C.

It has been found that notwithstanding the elimination of the pretreatment step, the subjection of the fabric to the latex liquid mixture prior to the vulcanization thereof with the hydronitrile rubber provides improved high adhesiveness and peel strength.

Bonding of the treated fabric to the hydronitrile rubber is effected by associating the treated fabric to unvulcanized high temperature-resistant hydronitrile rubber and vulcanizing the rubber while maintained in association with the fabric.

INDUSTRIAL APPLICABILITY

The rubber/fabric composite formed by the novel method of the present invention is advantageously adapted for use in the manufacture of transmission belts, conveyor belts, hoses, etc., where oil and high temperature conditions may be present. In one example of rubber/fabric composite manufacture embodying the invention, a fabric formed of aromatic polyamid Kevlar ® fiber cord was composed of $1500^D/1 \times 4$ in a latex liquid mixture, as set forth in Table I below. It was subjected to the liquid mixture for 2 minutes at 200° C. The cord was then spun onto an adhesive tape wound around a drum on which hydronitrile rubber compound 3 mm thick was laminated. The laminated sample was vulcanized for 30 minutes at 150° C. and the sample was cut to 1" wide test strips for measurement of the adhesive characteristics, or peel strength of the fabric relative to the rubber. The test was run at a tension speed of 50 mm per minute, using a peeling tester manufactured by Shimadzu Corporation of Japan, comprising an Autograph tester thereof.

TABLE I

|  | Treatment Compositions | | | |
| --- | --- | --- | --- | --- |
|  | A | B | C | D |
| Resorcinol | 5.0 | 5.0 | 5.0 | 5.0 |
| Formalin | 3.1 | 3.1 | 3.1 | 3.1 |
| Nipol #1571 | 61.6 | — | — | — |
| Nipol #L × 110 | — | 61.6 | — | — |
| JSR #0652 | — | — | 61.6 | — |
| LV-60 | — | — | — | 41.0 |
| Water | 84.3 | 84.3 | 84.3 | 104.9 |
| TOTAL | 154.0 | 154.0 | 154.0 | 154.0 |

Method A comprises a manufacturing method within the parameters discussed above and, thus, comprehended by the present invention. Methods B, C and D differ from Method A by variations in the components of the treatment liquid as indicated. In each case, the mol ratio of resorcinol to formalin is 1.2 to 1.

Nipol #1571 comprises nitrile-butadiene rubber latex manufactured by Nippon Zeon of Japan. Nipol #L x 110 comprises styrene-butadiene rubber latex manufactured by Nippon Zeon. JSR #0652 comprises VP latex manufactured by Nippon Synthetic Rubber, of Japan. LV-60 comprises chloroprene rubber latex manufactured by Denki Kagaku, of Japan.

One rubber compound to which the fabric was bonded comprises a formulation as set forth in the following table II:

TABLE II

|  | Rubber Compositions | |
| --- | --- | --- |
| Composition | A | B |
| Nitrile Rubber | — | 100 |
| Hydronitrile rubber | 100 | — |
| FEF carbon black | 40 | 40 |
| Zinc white | 5 | 5 |
| Stearic acid | 1 | 1 |
| Antioxidant | 2 | 2 |
| Vulcanization accelerator | 3 | 3 |

The peeling strength, or adhesiveness, characteristics, as measured in kilograms per inch by the above-indicated testing method, is set out in Table III for both the hydronitrile rubber and nitrile rubber composites.

TABLE III

| Peeling strength | Treatment Compositions | | | |
|---|---|---|---|---|
| (kg/in) | A | B | C | D |
| Nitrile rubber (Comp. B) | 11.0 | 3.5 | 6.5 | 7.0 |
| Hydronitrile rubber (Comp. A) | 18.3 | 2.1 | 6.0 | 6.5 |

As further shown in Table IV below, the adhesive strength of the treated cords relative to hydronitrile rubber for the different cords indicated is very high.

TABLE IV

| | Cord Compositions | | | |
|---|---|---|---|---|
| | Polyvinyl alcohol | Aliphatic polyamide | Polyester | Glass |
| Configuration | 1200D 3 × 3 | 1260D 3 × 3 | 1100D 3 × 3 | ECG-150 −3/13 |
| Peeling strength (kg/in) | 25.0 | 26.0 | 21.5 | 24.5 |

In a further exemplary embodiment of the invention, samples of the aromatic polyamide fabric cord were first pretreated in different pretreatment liquids, as set out in the following Table V. The cord was then dried for 2 minutes at 190° C. and then immersed in treatment liquid A, as indicated in Table II, for 2 minutes at 200° C.

TABLE V

| | Weight | | |
|---|---|---|---|
| | E | F | G |
| PAPI | 9 | — | 4.5 |
| Epikote 828 | — | 9 | 4.5 |
| DMP-30 | — | 1 | — |
| Toluene | 141 | 156 | 141 |

TABLE VI

| | E | F | G |
|---|---|---|---|
| Peeling strength (kg/in) | 23.0 | 21.5 | 24.5 |

PAPI, as indicated in Table V, comprises an isocyanate manufactured by Upjohn. The portions given in Table V are by weight.

Referring now to FIG. 1 of the drawing, the mol ratio of resorcinol to formalin in the treatment liquid was varied and the adhesive strength measured with the results as indicated in FIG. 1. As shown therein, a range of approximately 1 to 1 to approximately 2 to 1 of the mol ratio of resorcinol to formalin in the treatment liquid provides optimal results while excellent results are obtained by maintaining the ratio in the range of approximatey 1 to 3 to approximately 2 to 1.

Figure 2:
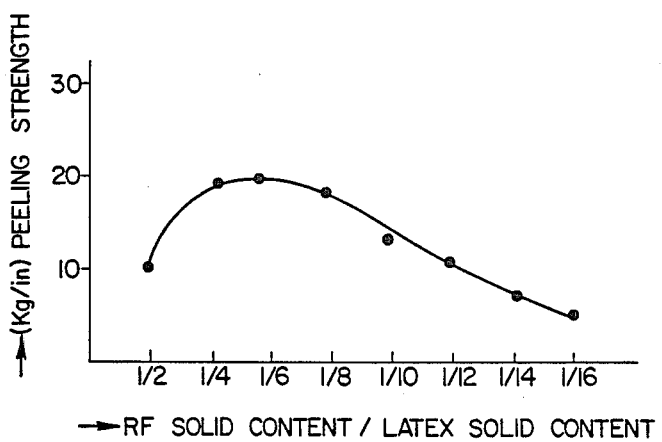
FIG. 2 is a graph illustrating the correpsondence of the solid ratio of resorcinol/formalin to latex in the liquid mixture relative to the adhesion or peeling strength.

Referring now to the FIG. 2 graph, by maintaining the mol ratio of resorcinol to formalin in the mixture at 1.2 to 1 and varying the resorcinol/formalin component to the latex solid content, the adhesive strength varies as shown. As indicated, aa ratio of approximately 1 to 4 to approximately 1 to 8 appears to be optimal, while the range of approximately 1 to 2 to approximately 1 to 10 provides excellent results.

Figure 3:
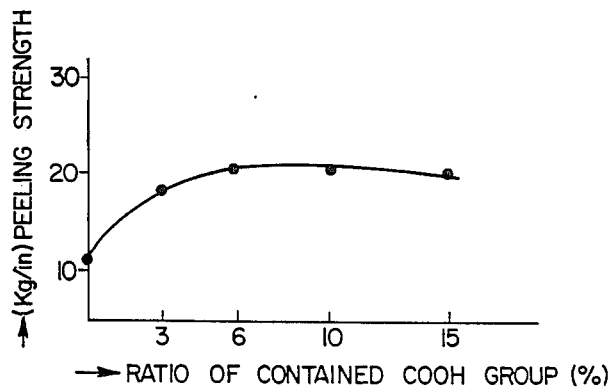
FIG. 3 is a graph illustrating the relationship of the carboxyl group content of the acrylonitrile-butadiene-latex relative to the adhesive or peeling strength of the composite.

Referring now to FIG. 3, the variations in the carboxyl group content of the acrylonitrile-butadiene latex causes a variation in the adhesive strength as indicated. As indicated, where the carboxyl group content is at least approximaty 3%, optimal adhesiveness or peeling strength is obtained.

Another rubber compound to which the fabric was bonded comprises a formulation as set forth in the following Table VII:

TABLE VII

| Composition | A |
|---|---|
| Hydronitrile Rubber | 100 |
| FEF Carbon Black | 40 |
| Plasticizers | 1.5 |
| Stearic Acid | 1.0 |
| Zinc Oxide | 2.0 |
| Magnesium Oxide | 4.0 |
| Antioxidant | 3.5 |
| Triallyl Isocyanurate | 2.5 |
| Organic Peroxides (Vulcanization Accelerator) | 3.0 |

It has been found that the rubber-fabric composite manufacture utilizing the rubber composition of Table VII provides a further improved manufacture. Elimination of sulfur in the rubber composition has been found to provide improved adhesiveness and peel strength of the fabric relative to the rubber.

As indicated above, the resultant rubber/fabric composites provided by following the improved manufacturing methods discussed above may be utilized in a wide range of industrial applications, including conveyor belting, transmission belting, hoses, etc., wherein high oil resistance and temperature resistance are required in combination with high adhesiveness or peel strength of the fabric relative to the rubber. As discussed above, the present invention comprehends the provision of such rubber/fabric composites wherein the rubber comprises hydronitrile rubber compounded with low or no sulfur content.

The foregoing disclosure of specific embodiments is illustrative of the broad inventive concepts comprehended by the invention.

We claim:

1. A rubber/fabric composite manufacture comprising:
   a body of rubber substantially free of sulfur comprising a blend of approximately 100 parts by weight hydronitrile rubber, 40 parts by weight FEF carbon black, 1.5 parts by weight plasticizers, 2 parts by weight zinc white, 1 part by weight stearic acid, 4 parts by weight magnesium oxide, 3.5 parts by weight antioxidant, and a vulcanizing agent having 3 parts by weight organic peroxide and 2.5 parts by weight triallyl isocyanurate; and
   a fabric bonded to said body as a result of vulcanization of the rubber body while the fabric is maintained in association therewith, said fabric being formed of cords having a surface configuration resulting from the subjection thereof, prior to the bonding of the fabric to the rubber body, to a liquid containing acrylonitrile-butadiene latex and a resorcinol-formalin mixture wherein the solid weight ratio of the acrylonitrile-butadiene-latex to the resorcinol-formalin is in the range of from approximately 10 to 1 to approximately 2 to 1, the mol ratio of resorcinol to formalin is in the range of from approximately 1 to 3 to approximately 3 to 1, and the acrylonitrile-butadiene-latex contains at least approximately 3% carboxyl groups.

2. The rubber/fabric composite manufacture of claim 1 wherein said fabric cords are formed of a member selected from the group consisting of cotton, rayon, polyvinyl alcohol, aliphatic polyamide, aromatic polyamide, polyester, and glass.

3. The rubber/fabric composite manufacture of claim 1 wherein said fabric cords are formed of Kevlar ® aromatic polyamide.

4. A rubber/fabric composite manufacture comprising:

a body of rubber substantially free of sulfur comprising a blend of approximately 100 parts by weight hydronitrile rubber, 40 parts by weight FEF carbon black, 1.5 parts by weight plasticizers, 2 parts by weight zinc white, 1 part by weight stearic acid, 4 parts by weight magnesium oxide, 3.5 parts by weight antioxidant, and a vulcanizing agent having 3 parts by weight organic peroxide and 2.5 parts by weight triallyl isocyanurate; and a fabric bonded to said body as a result of vulcanization of the rubber body while the fabric is maintained in association therewith, said fabric being formed of cords having a surface configuration resulting from the subjection thereof, prior to the bonding of the fabric to the rubber body, sequentially to a pretreated solvent and to a liquid containing acrylonitrile-butadiene-latex and a resorcinol-formalin mixture wherein the solid weight ratio of the acrylonitrile-butadiene-latex to the resorcinol-formalin is in the range of from approximately 10 to 1 to approximately 2 to 1, the mol ratio or resorcinol to formalin is in the range of from approximately 1 to 3 to approximately 3 to 1, and the acrylonitrile-butadiene-latex contains at least approximately 3% carboxyl groups.

5. The rubber/fabric composite manufacture of claim 4 wherein said solvent comprises a solvent selected from the group consisting of isocyanate solvent, epoxy solvent, and liquid mixtures thereof.

6. A rubber/fabric composite manufacture comprising:

a body of rubber substantially free of sulfur comprising a blend of approximately 100 parts by weight hydronitrile rubber, 40 parts by weight FEF carbon black, 1.5 parts by weight plasticizers, 2 parts by weight zinc white, 1 part by weight stearic acid, 4 parts by weight magnesium oxide, 3.5 parts by weight antioxidant, and a vulcanizing agent having 3 parts by weight organic peroxide and 2.5 parts by weight triallyl isocyanurate; and a fabric bonded to said body as a result of vulcanization of the rubber body while the fabric is maintained in association therewith, said fabric being formed of cords having a surface configuration resulting from the subjection thereof, prior to the bonding of the fabric to the rubber body, to a liquid containing acrylonitrile-butadiene-latex and a resorcinol-formalin mixture wherein the solid weight ratio of the acrylonitrile-butadiene-latex to the resorcinol-formalin is in the range of from approximately 10 to 1 to approximately 2 to 1, the mol ratio of resorcinol to formalin is in the range of from approximately 1 to 3 to approximately 3 to 1, and the acrylonitrile-butadiene-latex contains at least approximately 3% carboxyl groups, and subsequent heat treatment thereof.

7. The rubber/fabric composite manufacture of claim 6 wherein said fabric cord surface configuration comprises a configuration resulting from said heat treatment at a temperature in the range of approximately 140° C. to approximately 210° C.

8. The rubber/fabric composite manufacture of claim 6 wherein said fabric is formed by aromatic polyamide resin and said surface configuration comprises a configuration resulting from said heat treatment at a temperature in the range of approximately 190° C. to approximately 200° C. for approximately 2 minutes.

9. A rubber/fabric composite manufacture comprising:

a body of vulcanized rubber substantially free of sulfur and comprising hydronitrile rubber incorporating as the vulcanization agent thereof solely organic peroxide and triallyl isocyanurate; and a fabric bonded to said body as a result of vulcanization of the rubber body while the fabric is maintained in association therewith, said fabric being formed of cords having a surface configuration resulting from the subjection thereof, prior to the bonding of the fabric to the rubber body, to a liquid containing acrylonitrile-butadiene-latex and a resorcinol-formalin mixture wherein the solid weight ratio of the acrylonitrile-butadiene-latex to the resorcinol-formalin is in the range of from approximately 10 to 1 to approximately 2 to 1, the mol ratio of resorcinol to formalin is in the range of from approximately 1 to 3 to approximately 3 to 1, and the acrylonitrile-butadiene-latex contains at least approximately 3% carboxyl groups.

10. The rubber/fabric composite manufacture of claim 9 wherein said fabric cords are formed of Kevlar ® aromatic polyamide.

* * * * *